(12) United States Patent
Toyomasu et al.

(10) Patent No.: US 6,919,791 B2
(45) Date of Patent: Jul. 19, 2005

(54) ELECTRONIC KEY DEVICE FOR VEHICLE AND STARTING CONTROL METHOD FOR VEHICLE

(75) Inventors: Shunichi Toyomasu, Isehara (JP); Tetsuya Asada, Hadano (JP); Yoshiki Onuma, Ebina (JP); Teppei Nagano, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 270 days.

(21) Appl. No.: 10/426,790

(22) Filed: May 1, 2003

(65) Prior Publication Data
US 2003/0210130 A1 Nov. 13, 2003

(30) Foreign Application Priority Data
May 13, 2002  (JP) ........................ 2002-136923

(51) Int. Cl.$^7$ .................. G05B 19/00; H04Q 9/00; H01H 47/00; H02G 3/00
(52) U.S. Cl. ................. 340/5.31; 340/5.61; 307/10.5; 307/10.6
(58) Field of Search ............... 340/5.31, 5.61; 307/10.5, 10.6

(56) References Cited

U.S. PATENT DOCUMENTS

| | | | |
|---|---|---|---|
| 5,552,641 A | 9/1996 | Fischer et al. | |
| 5,982,295 A | * 11/1999 | Goto et al. | 340/10.52 |
| 6,480,095 B1 | * 11/2002 | Flick | 340/5.2 |
| 6,489,886 B2 | * 12/2002 | Meier | 340/426.1 |
| 6,580,353 B1 | 6/2003 | Geber et al. | |

FOREIGN PATENT DOCUMENTS

EP          1 035 283 A2      9/2000

OTHER PUBLICATIONS

"March New Model Description" of Feb. 2002 by Nissan Motors.

* cited by examiner

*Primary Examiner*—Brian Zimmerman
*Assistant Examiner*—Scott Au
(74) *Attorney, Agent, or Firm*—Foley & Lardner LLP

(57) ABSTRACT

An electronic key device for a vehicle which performs starting of the vehicle by performing ID verification against a portable electronic key unit includes an ID verification device, a decision device, and a vehicle starting control device. When the number of times that the result of ID checking by the ID verification device is negative and also the portable key unit is not present within the vehicle arrives at a predetermined value, a locked mode is set in which thereafter starting of the vehicle is prohibited unless a predetermined procedure is performed. When the result of ID checking by the ID verification device is affirmative and the portable key unit is not present within the vehicle, then no such predetermined number of times calculation for setting the locked mode is performed.

9 Claims, 4 Drawing Sheets

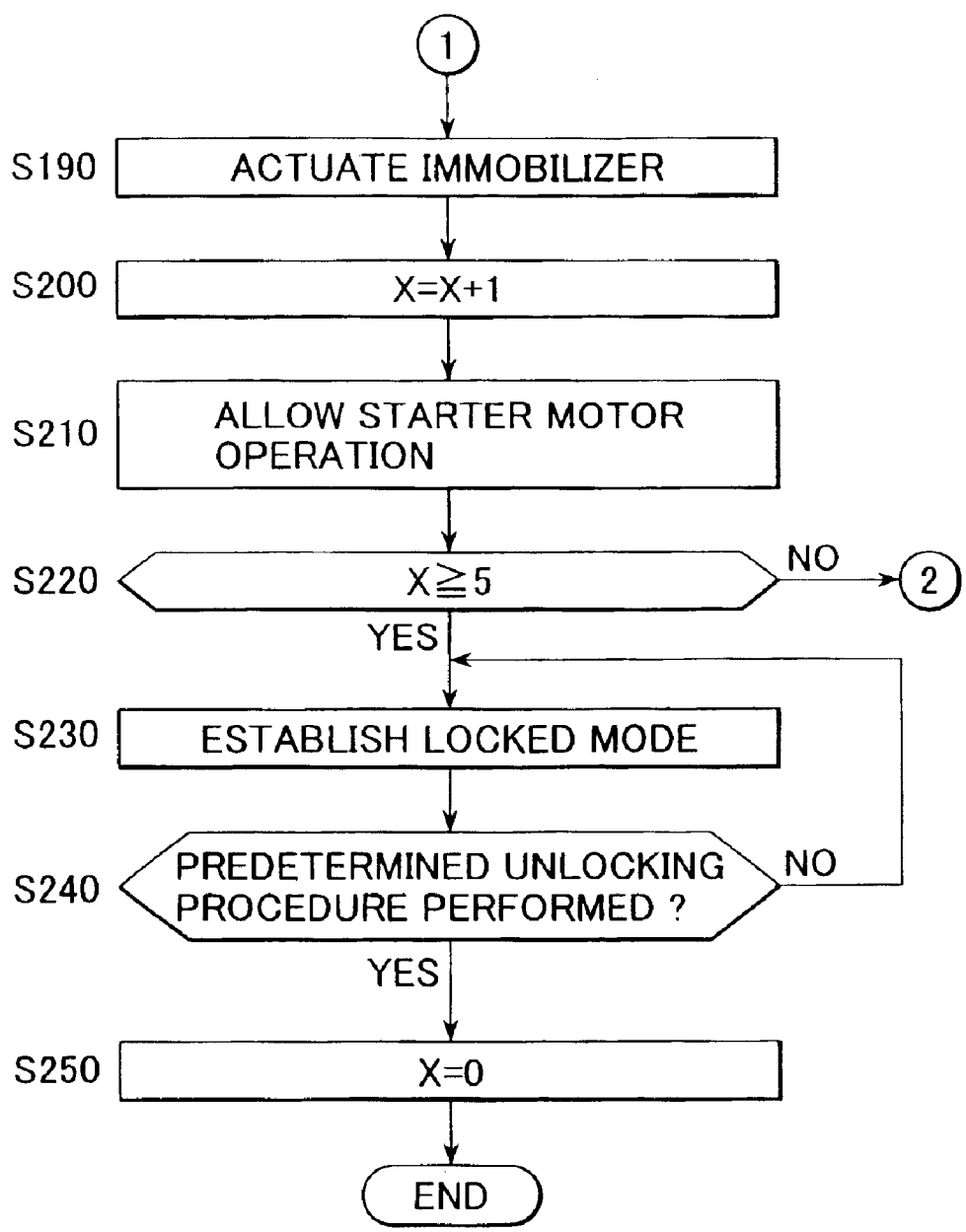

ELECTRONIC KEY DEVICE FOR VEHICLE AND STARTING CONTROL METHOD FOR VEHICLE

BACKGROUND OF THE INVENTION

1. Field of the Invention

The present invention relates to an electronic key device for a vehicle, and to a starting control method for a vehicle, which perform ID verification, in order to perform door unlocking and vehicle starting, by performing wireless communication between an electronic key which is carried by the driver and a vehicle mounted device.

2. Description of the Related Art

There is a per se known type of electronic key device for a vehicle in which, when an engine starting knob (hereinafter termed an "ignition knob") is actuated by being pressed in, an electronic key's ID is verified by performing wireless communication between a vehicle mounted device which is provided to the vehicle and an electronic key which is carried by the driver, and the locking of the ignition knob is released based upon the result of this ID verification (see "*March New Model Description*" of February 2002 by Nissan Motors). After the locking of the ignition knob has been released, engine starting is enabled by it now being made possible to rotate the ignition knob from the lock position to the engine starting position. With this electronic key device for a vehicle, in order to enhance the anti theft characteristic, if the result of ID verification upon actuation of the ignition knob is NG (fail) a certain predetermined number of times in succession (for example five times), then it is arranged for the system subsequently to set a locked mode in which the engine cannot be started unless a predetermined operation is performed.

Furthermore, with an electronic key device for a vehicle, if, for example, after the user of the vehicle has once started the engine, the engine stops in the state in which the ignition knob has not been returned to the locked position from the ON position, and he goes away from the vehicle, since the locking of the ignition knob is in the cancelled state, it becomes possible for a person other than the owner of the vehicle to rotate the ignition knob even if he is not in possession of the electronic key. Accordingly, in order to enhance the anti theft characteristic, ID verification is performed when the ignition knob is rotated to the ON position, and engine starting permission or prohibition is performed based upon the result of this ID verification.

SUMMARY OF THE INVENTION

However, with an electronic key device for a vehicle according to the prior art, in the above type of circumstances, in other words in the situation in which after having started the engine the vehicle owner goes away from the vehicle without returning the ignition knob to the lock position, if then the owner of the vehicle gets back into the vehicle without carrying the electronic key, even if he tries to perform engine starting, he cannot start the engine. In this case, there is a possibility that the locked mode may be undesirably set, since it can happen that the operator may repeatedly attempt to perform starting operation without realizing that he is not carrying the electronic key.

It would be desirable to provide an electronic key device for a vehicle, and a starting control method for a vehicle, with which, after prohibition of rotation actuation of a rotational actuation device has been cancelled, the locked mode is prohibited to be set, even if during vehicle starting operation it is decided that a portable unit is not present within the vehicle.

In a starting control method for a vehicle according to the present invention, when a first operational condition that ID verification against a portable key unit is OK, and a second operational condition that the portable key unit is present within a passenger compartment of the vehicle, are both satisfied, vehicle starting by vehicle starting operation is permitted. When at least the first operational condition is not satisfied, along with prohibiting vehicle starting, if vehicle starting operation is repeated for at least a predetermined number of times in succession, thereafter a locked mode is set in which vehicle starting cannot be performed without performing a predetermined operational procedure and if the first operational condition is satisfied and the second operational condition is not satisfied, along with prohibiting vehicle starting, the locked mode is prohibited to be set even if vehicle starting operation is repeated for the predetermined number of times in succession.

An electronic key device for a vehicle which performs starting of the vehicle by performing ID verification against a portable key unit according to the present invention comprises an advance actuation detection device which detects advance actuation for performing vehicle starting operation, an ID verification device which performs ID verification against the portable key unit when advanced actuation has been detected, a decision device which decides whether or not the portable key unit is present within the vehicle when vehicle starting operation has been performed and a vehicle starting permission device which permits starting of the vehicle when the ID checking result and also the result of the decision by the decision device are both affirmative. When the situation is repeated that the result of ID checking is negative and also it is decided that the portable key unit is not present within the vehicle, the vehicle starting permission device calculates the number of times that this situation has been repeated, and when this calculated number of times arrives at a predetermined value, a locked mode is set in which starting of the vehicle is prohibited unless a predetermined procedure is performed. While, when the result of ID checking is affirmative and also it is decided that the portable key unit is not present within the vehicle, the vehicle starting permission device does not perform such a predetermined number of times calculation for setting the locked mode.

BRIEF DESCRIPTION OF THE DRAWINGS

FIG. 5 is a flow chart for this preferred embodiment, showing a processing procedure which is executed when regular operation has not been performed.

DETAILED DESCRIPTION OF THE PREFERRED EMBODIMENT

Figure 1:
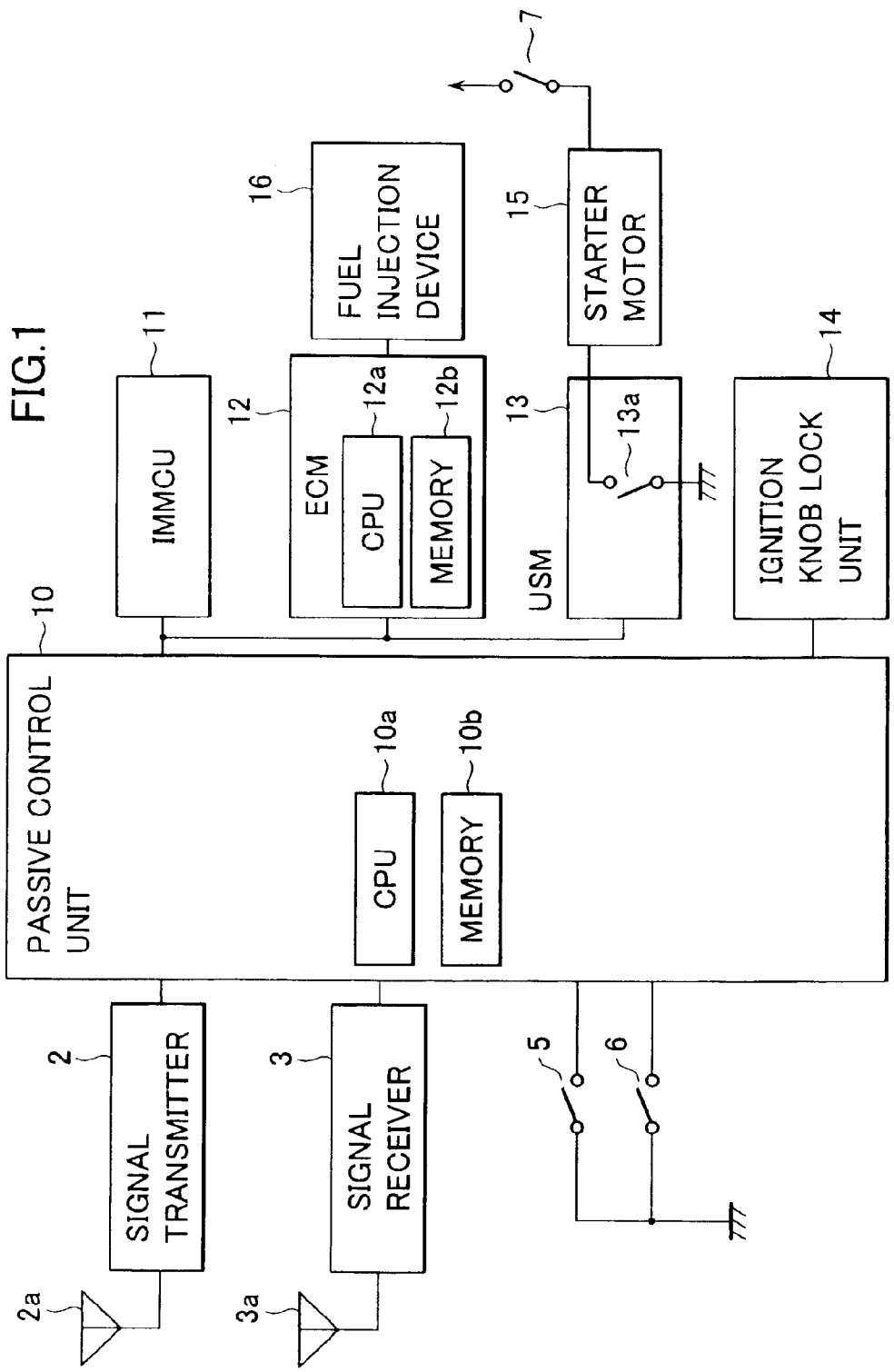
FIG. 1 shows the structure of a preferred embodiment of a vehicle mounted device which is used in an electronic key device for a vehicle according to the present invention.
Figure 2:
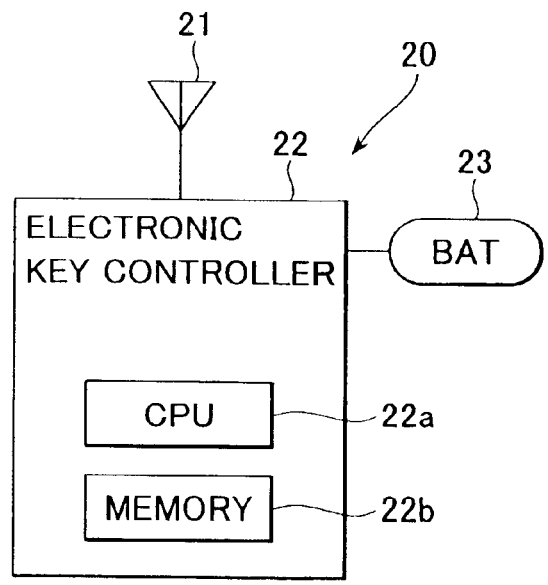
FIG. 2 shows the structure of a preferred embodiment of an electronic key which is used in this electronic key device for a vehicle according to the present invention.
Figure 3:
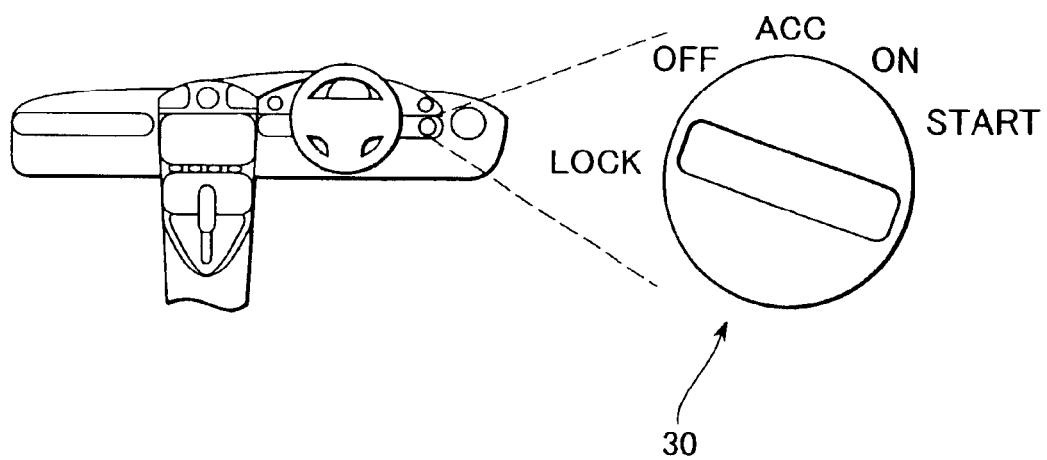
FIG. 3 shows an ignition knob.

FIG. 1 is a figure showing the structure of a vehicle mounted device which is used in the preferred embodiment of the electronic key device for a vehicle according to the present invention. FIG. 2 is a figure showing the structure of a portable electronic key which is used in this preferred embodiment of the electronic key device for a vehicle according to the present invention. FIG. 3 is a figure showing an ignition knob which is used for engine starting and the like.

As shown in FIG. 2, the electronic key 20 comprises an antenna 21, an electronic key controller 22 and a battery 23. The electronic key controller 22 comprises a CPU 22a and a non volatile memory 22b, and performs wireless communication with a vehicle mounted device 1 via the antenna 21. An ID which is unique to the electronic key 20 is stored in the non volatile memory 22b. The battery 23 is a replaceable cell for supplying electrical power to the electronic key controller 22.

The electronic key 20 does not include any key plate like an ignition key according to the prior art; it is formed so as to be easily portable by the driver, for instance in the form of a card. No key cylinder unit for receiving the electronic key 20 is provided within the vehicle mounted device 1; it is sufficient for the driver simply to sit in the vehicle while carrying the electronic key 20. Due to this, with this preferred embodiment, instead of a key cylinder unit of an electronic key device for a vehicle according to the prior art, there is provided an ignition knob lock unit 14 (refer to FIG. 1) which locks the rotation of an ignition knob 30. Accordingly, there is no requirement for engine starting, as there was in the prior art to perform any procedure of inserting and turning an ignition key.

However, since the electronic key 20 is a device which is operated by electrical power, the fear arises that the engine cannot be started when the electronic key 20 cannot be supplied with power from the battery 23 (i.e. in the so called "battery disconnected" state). In order to prevent this sort of situation from arising, there is appended to the electronic key 20 an ignition key for emergency use, which is the type of key which is inserted into a keyhole. In other words, when the battery is disconnected, it is possible to perform starting of the engine by inserting the ignition key for emergency use into the keyhole which is provided upon a grip portion of the ignition knob 30.

When the driver wishes to start the engine of the vehicle, he must perform rotational actuation of the ignition knob 30, after having pushed it inward. As shown in FIG. 3, when the ignition knob 30 which is at the LOCK position is pushed inward, a push switch 5 (refer to FIG. 1) is turned ON. Furthermore, when the ignition knob 30 is rotated to the ignition ON position (the ON position) in order to start the engine, an ignition ON switch 6 is turned ON. Furthermore, when the ignition knob 30 is rotated to an engine start position (the START position) in order to start the engine of the vehicle by a starter motor 15, an engine start switch 7 is turned ON.

The vehicle mounted device 1 comprises a signal transmitter 2 and a signal receiver 3 for performing wireless communication with the electronic key 20. Via an antenna 2a which is provided within the vehicle, the signal transmitter 2 transmits an ID request signal which will be described hereinafter throughout the interior of the vehicle passenger compartment. Via an antenna 3a which is provided upon the rear parcel shelf at the rear portion of the vehicle, the signal receiver 3 receives a signal including ID and the like which is transmitted from the electronic key 20. Having been received, these signals are transmitted to a passive control unit 10.

When pushing in operation of the ignition knob 30 is performed and the push switch 5 goes to ON, the passive control unit 10 transmits an ID request signal throughout the interior of the vehicle passenger compartment via the signal transmitter 2 and the antenna 2a. The electronic key 20 having received this ID request signal reads out the ID from its non volatile memory 22b, and transmits this ID to the vehicle mounted device 1 via the antenna 2a. The passive control unit 10 performs ID verification based upon this ID which has been transmitted from the electronic key 20, and, if the result of this ID checking is OK, along with permitting rotational operation of the ignition knob 30, the passive control unit 10 sets a flag 1 which indicates that the ID checking result is OK and a flag 2 which indicates that the electronic key 20 is present within the vehicle passenger compartment. It is to be noted that ID verification is performed by a CPU 10a, and the flag 1 and the flag 2 are stored within a memory 10b.

The flag 1 is set, if the ID checking result upon the push switch 5 going to ON is OK, during the time interval until the push switch 5 goes to OFF, in other words, until the ignition knob 30 is returned to the locked position. On the other hand, the flag 2 is reset even if the ignition knob 30 is not returned to the locked position. In other words, the decision as to whether or not the electronic key 20 is present within the vehicle is performed over and over, and if it is decided that the electronic key 20 is in fact not present within the vehicle even after the flag 2 has been set, then the flag 2 is reset. It is to be noted that this decision is performed, as has been described above, by transmitting the ID request signal throughout the interior of the vehicle passenger compartment and thereby executing ID verification.

Along with transmitting an immobilizer operate/release command signal to an immobilizer control unit 11 based upon the flag 1, the passive control unit 10 also transmits a permit/prohibit command for operation of the starter motor 15 to the immobilizer control unit 11 (hereinafter termed the IMMCU 11) based upon the flag 2.

The ignition knob lock unit 14 includes a knob rotation prohibition latch (not shown in the figures) for locking the ignition knob 30 and thus prohibiting its rotational actuation. When the result of ID verification performed when the push switch 5 has gone to ON is OK, the passive control unit 10 outputs a rotation permit command for the ignition knob 30 to the ignition knob lock unit 14. The ignition knob lock unit 14 having received this command allows the rotational actuation of the ignition knob 30 by driving the knob rotation prohibition latch towards its release side.

Based upon the immobilizer operate/release command signal which is sent from the passive control unit 10, the IMMCU 11 transmits a permit/prohibit command for fuel injection control to an engine control module 12 (hereinafter termed an ECM 12) which will be described hereinafter. Furthermore, based upon the permit/prohibit command for operation of the starter motor 15, the IMMCU 11 transmits an open circuit/close circuit command for the switch 13a to an underhood switching module 13 (hereinafter termed an USM 13).

The ECM 12 comprises a CPU 12a and a non volatile memory 12b which stores a number of times of improper operation which will be described hereinafter. The ECM 12 controls a fuel injection device 16 based upon the permit/prohibit command for fuel injection which is transmitted from the IMMCU 11 and upon this number of times of improper operation which is stored in the non volatile memory 12b, and, along with controlling the starting of the engine, also controls the engine rotational speed and the engine output torque after the engine has been started.

The USM 13 comprises a switch 13a for performing permission/prohibition of the operation of the starter motor 15 which is used when starting the engine. When a close circuit command for the switch 13a has been transmitted from the IMMCU 11, this switch 13a closes, while, when an open circuit command for the switch 13a has been transmitted from the IMMCU 11, the switch 13a opens. With the electronic key device for a vehicle according to this preferred embodiment of the present invention, when the flag 2 is reset, the switch 13a is opened and the operation of the starter motor 15 is prohibited.

For starting the vehicle engine, it is necessary for the operation of the starter motor 15 to be permitted by the passive control unit 10, and also for a fuel injection control permit signal to be transmitted to the ECM 12. Accordingly, if a person who does not posses the proper electronic key 20 should attempt to start the engine by improper operation (the flag land the flag 2 are in the reset state), it is not possible for starting of the engine to be performed, because a fuel injection control prohibit signal is transmitted to the ECM 12. Furthermore when, for example, after starting the engine, the driver stops the engine and leaves the vehicle in the state in which the ignition knob 30 has not been returned to the locked position, even if a parson who does not possess the electronic key 20 tries to start the vehicle engine, he cannot perform starting of the engine, since the operation of the starter motor 15 is prohibited because the switch 13a is open since the flag 2 is reset. In other words, it is not possible to perform engine starting unless both the flag 1 and the flag 2 are set.

With the electronic key device for a vehicle according to this preferred embodiment of the present invention, when, in the state in which the flag 1 and the flag 2 are reset, when the number of attempts in succession which a person who does not possess the proper electronic key 20 has made to start the engine of the vehicle by dishonest operation (the number of times of improper operation) reaches five, a locked mode is set in which it becomes impossible to perform engine starting. When once the locked mode has been set, thereafter it is not possible to start the engine of the vehicle unless a predetermined procedure for canceling the locked mode is performed.

With the electronic key device for a vehicle according to this preferred embodiment of the present invention, if, after a person who possesses the proper electronic key 20 has performed engine starting, and after he then stops the engine and leaves the vehicle in the state in which the ignition knob 30 has not been returned to the locked position, he returns to the vehicle having forgotten to bring the electronic key 20 and attempts to start the engine, the locked mode is not set. In other words, in this type of case, although the flag 2 which indicates that the electronic key 20 is present within the vehicle passenger compartment is reset, the locked mode is prohibited to be set, since the flag 1 remains set just as it is. Accordingly, it is possible for the driver to realize that he is not carrying the electronic key 20 from the fact that he cannot operate the starter motor 15 even though he is attempting engine starting operation. Furthermore, it is also not necessary to perform the predetermined procedure for canceling the locked mode as was the case with an electronic key device for a vehicle according to the prior art, since the locked mode is not set even if engine starting operation is repeated five times or more. In other words, with the electronic key device for a vehicle according to this preferred embodiment of the present invention, it becomes possible both to enhance the anti theft characteristic and also to satisfy the requirement for user convenience. Furthermore, since the operation of the starter motor 15 is prohibited in the state in which the flag 2 is reset, accordingly it is also possible to avoid excessive battery discharge (so called "battery flattening") of the battery of the vehicle, which might otherwise be caused by repeated engine starting operation.

Figure 4:
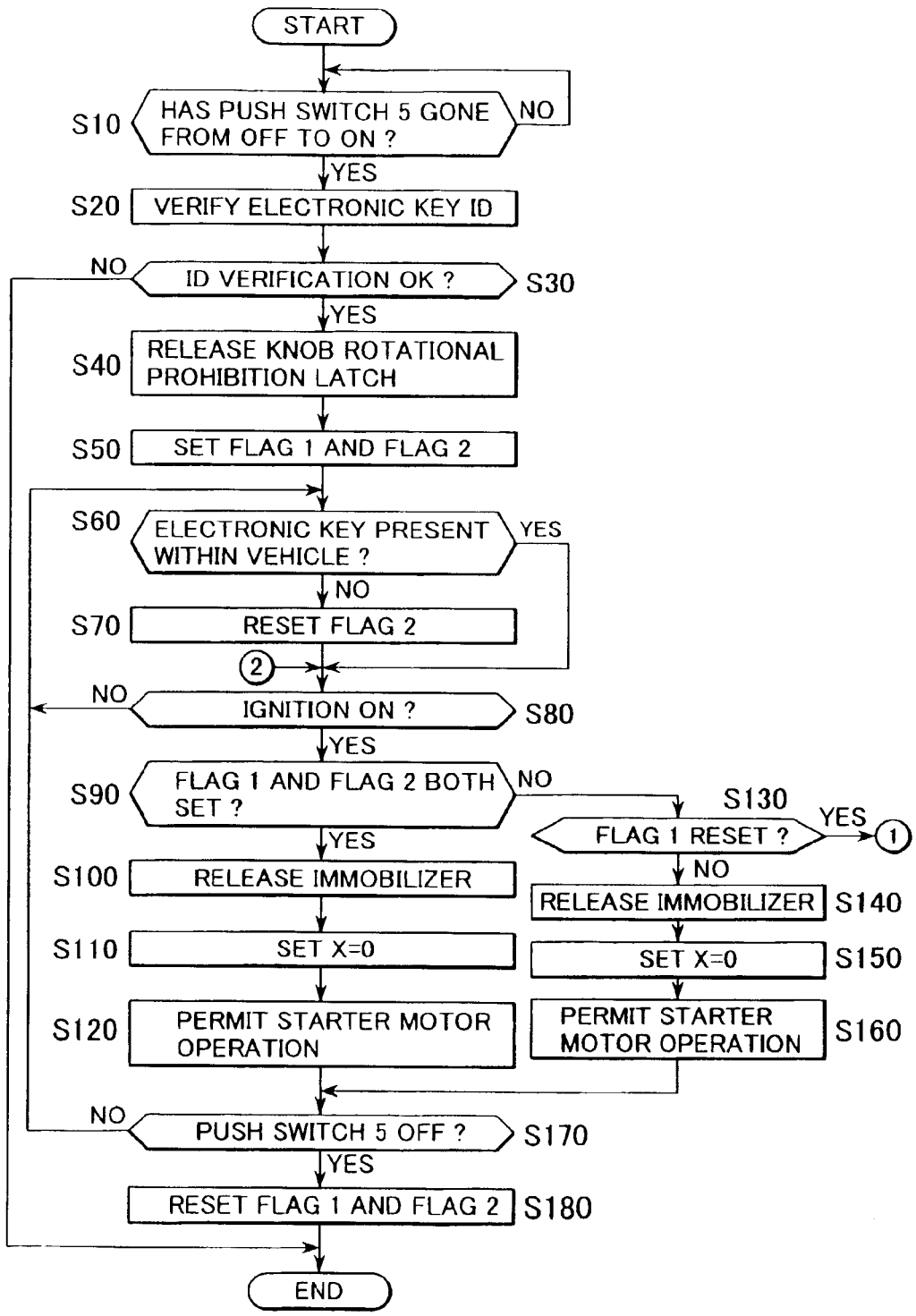
FIG. 4 is a flow chart for this preferred embodiment, showing a processing procedure which is executed by a passive control unit.

FIG. 4 is a flow chart showing the control flow of the preferred embodiment of the control procedure which is executed by the vehicle mounted device 1. In the first step S10, the passive control unit 10 makes a decision as to whether or not the push switch 5 has gone from OFF to ON. If it is decided that the push switch 5 has gone to ON by the ignition knob 30 being pushed in, then the flow of control continues to the step S20, while, if it is decided that the push switch 5 has not gone to ON, the flow of control waits in this step S10 until the push switch 5 does go to ON.

In the step S20, the passive control unit 10 performs ID verification of the electronic key 20, and then the flow of control proceeds to the step S30. In this step S30, the passive control unit 10 makes a decision as to whether or not the result of the ID verification in the step S20 is OK. If it is decided that the ID checking result is OK, in other words that the electronic key 20 is the proper key, then the flow of control proceeds to the step S40, while if it is decided that the ID checking result is NG, then the processing shown in this flow chart terminates.

In the step S40, the passive control unit 10 transmits a rotation permit command to the ignition knob lock unit 14, so as to release the knob rotational prohibition latch, and then the flow of control proceeds to the step S50. In this step S50, the passive control unit 10 sets the flag 1 and the flag 2 in the memory 10b, since the result of ID verification of the electronic key 20 was OK, and then the flow of control proceeds to the step S60. In this step S60, the passive control unit 10 makes a decision as to whether or not the electronic unit 20 is within the vehicle. This decision is performed by transmitting an ID request signal within the vehicle passenger compartment via the signal transmitter 2 and the antenna 2a. In other words, the procedure in the above described steps S20 and S30 is performed and the result of ID checking is OK, a decision is made that the electronic key 20 is within the vehicle. If it is decided that the electronic key 20 is indeed present within the vehicle, then the flow of control is transferred to the step S80, while if it is not present then the flow of control proceeds to the step S70.

In this step S70, the passive control unit 10 resets the flag 2 which was set in the step S50, and then the flow of control proceeds to the step S80. In this step S80, the passive control unit 10 makes a decision as to whether or not the ignition ON switch 6 has gone ON. When the result of ID checking which is performed by the procedure in the above described steps S20 and S30 is OK, rotational operation of the ignition knob 30 was permitted in the step S40 by releasing the knob rotational prohibition latch. When it is decided that the ignition ON switch 6 has gone to ON by rotational operation of the ignition knob 30, the flow of control proceeds to the step S90, while if it is decided that the ignition ON switch 6 has not gone to ON, then the flow of control returns to the step S60.

In the step S90, the passive control unit 10 makes a decision as to whether or not the flag 1 and the flag 2 in the memory 10b are both set. If it is decided that the flag land the flag 2 are both set, then the flow of control proceeds to the step S100, while, if it is decided that either or both of these flags are not set (i.e. are reset), then the flow of control is transferred to the step S130. In the step S100, the passive control unit 10 transmits an immobilizer release command to the IMMCU 11. When the IMMCU 11 receives this immobilizer release command, the IMMCU 11 permits fuel injection control by the ECM 12, and the flow of control proceeds to the next step S110. In this step S110, a number X of times of improper operation which is stored in the non volatile memory 12b is set to an initial value of zero, in order to count the number of times of improper operation X, which is the number of attempts at engine starting operation by a dishonest method that a person who does not possess the proper electronic key 20 has performed.

In the step S120 which follows the step S110, the passive control unit 10 transmits a command for permitting the operation of the starter motor 15 to the IMMCU 11. When the IMMCU 11 has received this command, the IMMCU 11 issues a close circuit command for the switch 13a to the USM 13. After this, when the ignition knob 30 is rotated as far as the engine start position, along with the start switch 7 being closed and the starter motor 15 being driven, the fuel injection device 16, a throttle valve control device (not shown in the figures), and an ignition device (not shown in the figures either) are drive controlled by the ECM 12, and then the engine is started.

In the step S130 to which the flow of control is transferred after it has been decided that it is not the case that both the flag 1 and the flag 2 are set, the passive control unit 10 makes a decision as to whether or not the flag 1 is reset. If it is decided that the flag 1 is not reset, then the flow of control proceeds to the step S140. Thus the flow of control proceeds to this step S140 if it is the case that the flag 1 is set and also the flag 2 is reset. In these circumstances it is considered that it may be the case that, for example, after the driver who possesses the proper electronic key 20 has started the engine of the vehicle, he has temporarily stopped the engine without returning the ignition knob 30 to the locked position and has left the vehicle, and that thereafter the driver, or a person who does not possess the proper electronic key 20, has tried to restart the vehicle engine.

In the step S140 the passive control unit 10 transmits an immobilizer release command to the IMMCU 11 so as to permit fuel injection control by the ECM 12, just as in the step S100, and then the flow of control proceeds to the step S150. In the step S150, the ECM 12 sets the above described number X of times of improper operation which is stored in the non volatile memory 12b to an initial value of zero, in order to count the number of times of improper operation X. In the step S160 which follows the step S150, the passive control unit 10 transmits a command for prohibiting the operation of the starter motor 15 to the IMMCU 11. When the IMMCU 11 has received this command, the IMMCU 11 issues an open circuit command for the switch 13a to the USM 13. After this, even if the ignition knob 30 is rotated as far as the engine start position, it is not possible to operate the starter motor 15 or to start the engine of the vehicle, because the switch 13a is open. When this operation of the starter motor 15 has been prohibited, the flow of control proceeds to the step S170.

In this step S170, the passive control unit 10 makes a decision as to whether or not the push switch 5 is OFF. If it is decided that the ignition knob 30 has been returned as far as the locked position so that the push switch 5 is OFF, then the flow of control proceeds to the step S180, while if it is decided that the push switch 5 is not OFF, then the flow of control returns to the step S60. In the step S180, since the push switch 5 is OFF, the flag 1 and the flag 2 are reset, and the processing shown in this flow chart terminates.

On the other hand, if it is decided in the step S130 that the flag 1 is reset, in other words when it is decided that both the flag 1 and the flag 2 are reset, then the flow of control is transferred to the step S190 of the flow chart which is shown in FIG. 5. This is the case in which the ignition ON switch 6 is ON though the flag 1 and the flag 2 are reset, and indicates the situation that it is not possible to perform normal engine starting procedures. In other words, the procedure from the step S190 through the step S250 to be described hereinafter is a procedure which is to be performed when some sort of improper operation has been performed by a third party who does not possess the proper electronic key 20.

In the step S190, the passive control unit 10 transmits an immobilizer actuation command to the IMMCU 11. When the IMMCU 11 has received this immobilizer actuation command, the IMMCU 11 prohibits fuel injection control by the ECM 12, and then the flow of control proceeds to the step S200. Due to this, the fuel injection device 16, the throttle valve control device (not shown in the figures), and the ignition device (not shown in the figures either) are controlled by the ECM 12, and starting of the engine is prohibited. In the next step S200, the ECM 12 adds 1 to the parameter X described above which is stored in the non volatile memory 12b and which indicates the number of attempts at improper operation, and then the flow of control proceeds to the step S210. In the step S210, the passive control unit 10 transmits a command to the IMMCU 11 to permit the operation of the starter motor 15. When the IMMCU 11 has received this command, the IMMCU 11 transmits a close circuit command to the USM 13. With the electronic key device for a vehicle according to this preferred embodiment of the present invention, although it is arranged that a command is issued to permit the operation of the starter motor 15, nevertheless it is still not possible to start the engine since the immobilizer is actuated in the step S190, as has been described above.

In the step S220 which follows the step S210, the ECM 12 makes a decision as to whether or not the value of the parameter X which is stored in the non volatile memory 12b and which indicates the number of attempts at improper operation is greater than or equal to 5. In this preferred embodiment, the locked mode is set if engine starting operation is attempted five times without the operator being in possession of the proper electronic key 20. When once the lock mode has been set, the engine cannot subsequently be started without performing the predetermined procedure. If the result of the decision in the step S220 is that the value of the parameter X is indeed greater than or equal to 5, then the flow of control proceeds to the step S230. In this step S230, the ECM 12 establishes the locked mode. On the other hand, if the result of the decision in the step S220 is that the value of the parameter X is less than 5, then the flow of control is transferred to the step S80 of the flow chart in FIG. 4.

When the locked mode has been set in the step S230, the flow of control proceeds to the next step S240. In the step S240, the passive control unit 10 makes a decision as to whether or not the predetermined operation for canceling the locked mode has been performed. If it is decided that indeed the predetermined procedure has been performed, then the flow of control proceeds to the next step S250; while if it is decided that the predetermined procedure has not yet been performed, then the flow of control loops back to the step S230. In the step S250 the passive control unit 10 transmits a command to cancel the locked mode to the ECM 12, since the predetermined procedure has been performed. When the ECM 12 receives this lock mode cancellation command, the ECM 12 resets the parameter X back to its initial value of zero. By doing this, fuel injection control by the ECM 12 becomes possible since the lock mode has been cancelled, so that it is possible for the engine to be started.

With the electronic key device for a vehicle according to this preferred embodiment of the present invention, after a person who possesses the proper electronic key 20 has started the vehicle engine, and he has then stopped the engine without returning the ignition knob 30 to the locked position and has left the vehicle, if he returns to the vehicle having forgotten to bring the electronic key 20 and attempts to start the engine, the locked mode is not set. In other words, since the locked mode is prohibited to be set even if engine starting operation is repeatedly attempted for the predetermined number of times (five times) or more, accordingly there is no requirement to perform the predetermined procedure for canceling the locked mode. The driver is able to realize that he is not carrying the electronic key 20 from the fact that in this state the engine of the vehicle does not start even though he attempts to perform engine starting operation. In this case the driver is able to go and fetch the proper electronic key, to return to the vehicle, and then to perform engine starting operation, thus starting the vehicle engine. In other words, with the electronic key device for a vehicle according to this preferred embodiment of the present invention, not only is the anti theft characteristic enhanced, but it is possible to satisfy the demand for user convenience.

The above described embodiment is an example, and various modifications can be made without departing from the spirit and scope of the invention. For example, although in the step S90 of the flow chart shown in FIG. 4 a decision was made as to whether or not the flag 1 and the flag 2 were set, it would also be possible, as an alternative, along with making a decision as to whether or not the flag 1 was set, actually to check whether or not the electronic key 20 was in the vehicle or not. This check could be implemented by performing the ID verification which was performed in the step S20 and the step S30.

Furthermore, in the shown preferred embodiment, the decision procedure in the step S60, in other words the decision as to whether or not the electronic key 20 was present within the vehicle, was performed after it was decided that the ID checking result in the step S30 was OK; but it would be possible to do so after a predetermined time interval had elapsed, or when some predetermined procedure was executed. Such a predetermined procedure might be, for example, the opening or closing of a vehicle door, or the like. Furthermore, although the above described preferred embodiment has been explained, by way of example, in terms of its application to an electronic key device for a vehicle which is driven by an engine, it would also be possible to apply the present invention to an electrically propelled vehicle, or to a hybrid automobile.

The disclosure of the following priority application is herein incorporated by reference: Japanese Patent Application 2002-136923 filed May 13, 2002.

What is claimed is:

1. A starting control method for a vehicle, comprising:
   permitting the vehicle to be started by vehicle starting operation when a first operational condition that ID verification against a portable key unit is OK, and a second operational condition that the portable key unit is present within a passenger compartment of the vehicle, are both satisfied, wherein;
   when at least the first operational condition is not satisfied, vehicle starting is prohibited, and a locked mode is set in which vehicle starting is prohibited until a predetermined operational procedure is performed if vehicle starting operation is repeated for at least a predetermined number of times in succession; and
   if the first operational condition is satisfied and the second operational condition is not satisfied, vehicle starting is prohibited, and the locked mode is prohibited to be set even if vehicle starting operation is repeated for the predetermined number of times in succession.

2. An electronic key device for a vehicle which performs starting of the vehicle by performing ID verification against a portable key unit, comprising:
   an advance operation detection device which detects advance operation for performing vehicle starting operation;
   an ID verification device which performs ID verification against the portable key unit when advanced operation has been detected by the advance operation detection device;
   a decision device which decides whether or not the portable key unit is present within the vehicle when vehicle starting operation has been performed; and
   a vehicle starting permission device which permits starting of the vehicle when the ID checking result by the ID verification device and also the result of the decision by the decision device are both affirmative, wherein:
   when the situation is repeated that the result of ID checking by the ID verification device is negative and also it is decided by the decision device that the portable key unit is not present within the vehicle, the vehicle starting permission device calculates the number of times that this situation has been repeated, and when this calculated number of times arrives at a predetermined value, a locked mode is set in which starting of the vehicle is prohibited unless a predetermined procedure is performed; while, when the result of ID checking by the ID verification device is affirmative and also it is decided by the decision device that the portable key unit is not present within the vehicle, the vehicle starting permission device does not perform such a predetermined number of times calculation for setting the locked mode.

3. An electronic key device for a vehicle according to claim 2, further comprising:
   an operation device which can be rotationally operated after having been pressed in;
   a rotation arresting device which prevents rotational operation of the operation device; and
   a cancellation command transmission device which transmits a command for the cancellation of the prohibition of rotational operation of the operation device by the rotation arresting device based upon the result of the ID checking which has been performed by the ID verification device, wherein:
   the advance operation detection device detects pressing in operation of the operation device.

4. An electronic key device for a vehicle according to claim 2, further comprising:
   a first vehicle starting control device and a second vehicle starting control device for performing vehicle starting control, wherein:
   the vehicle can be started when vehicle starting control by the first vehicle starting control device and the second vehicle starting control device is permitted by the vehicle starting permission device; and when the result of ID checking by the ID verification device is negative and also it is decided by the decision device that the portable key unit is not present within the vehicle, the vehicle starting permission device prohibits vehicle starting control by the first vehicle starting control device, and also performs the predetermined number of times calculation for setting the locked mode.

5. An electronic key device for a vehicle according to claim 4, wherein:

when the result of ID checking by the ID verification device is affirmative and also it is decided by the decision device that the portable key unit is not present within the vehicle, the vehicle starting permission device prohibits vehicle starting control by the second vehicle starting control device.

6. An electronic key device for a vehicle according to claim 4, wherein:

vehicle starting operation is engine starting operation, and the first vehicle starting control device is a control device for engine fuel injection, while the second vehicle starting control device is a control device for a motor for engine starting.

7. An electronic key device for a vehicle according to claim 5, wherein:

vehicle starting operation is engine starting operation, and the first vehicle starting control device is a control device for engine fuel injection, while the second vehicle starting control device is a control device for a motor for engine starting.

8. An electronic key device for a vehicle according to claim 2, wherein:

the portable key unit comprises a controller and an antenna so that ID signal is transmitted to the electronic key device for a vehicle.

9. An electronic key device for a vehicle which performs starting of the vehicle by performing ID verification against a portable key unit, comprising:

an advance operation detection means for detecting advance operation for performing vehicle starting operation;

an ID verification means for performing ID verification against the portable key unit when advanced operation has been detected by the advance operation detection means;

a decision means for deciding whether or not the portable key unit is present within the vehicle when vehicle starting operation has been performed; and a vehicle starting permission means for permitting starting of the vehicle, when the ID checking result by the ID verification means and also the result of the decision by the decision means are both affirmative, wherein:

when the situation is repeated that the result of ID checking by the ID verification means is negative and also it is decided by the decision means that the portable key unit is not present within the vehicle, the vehicle starting permission means calculates the number of times that this situation has been repeated, and when this calculated number of times arrives at a predetermined value, a locked mode is set in which starting of the vehicle is prohibited unless a predetermined procedure is performed; while, when the result of ID checking by the ID verification means is affirmative and also it is decided by the decision means that the portable key unit is not present within the vehicle, the vehicle starting permission means does not perform such a predetermined number of times calculation for setting the locked mode.

* * * * *